P. KLING.
Walking Planter.

No. 108,032. Patented Oct. 4, 1870.

United States Patent Office.

PETER KLING, OF SPRINGFIELD, ILLINOIS.

Letters Patent No. 108,032, dated October 4, 1870.

IMPROVEMENT IN PLOWS AND PLANTERS.

The Schedule referred to in these Letters Patent and making part of the same

*To all whom it may concern:*

Be it known that I, PETER KLING, of Springfield, in the county of Sangamon, and State of Illinois, have invented a certain new and useful Improvement in Machines for Plowing and Planting; and I do hereby declare the following to be a clear and exact description thereof, sufficient to enable others skilled in the art to which my invention appertains to make and use the same, reference being had to the accompanying drawing making part of this specification, in which—

Figure 3 is a bottom view of the revolving reciprocating disk, while

Figure 4 is a central section of the revolving disk.

Like letters of reference indicate corresponding parts in the several figures.

Figure 1:
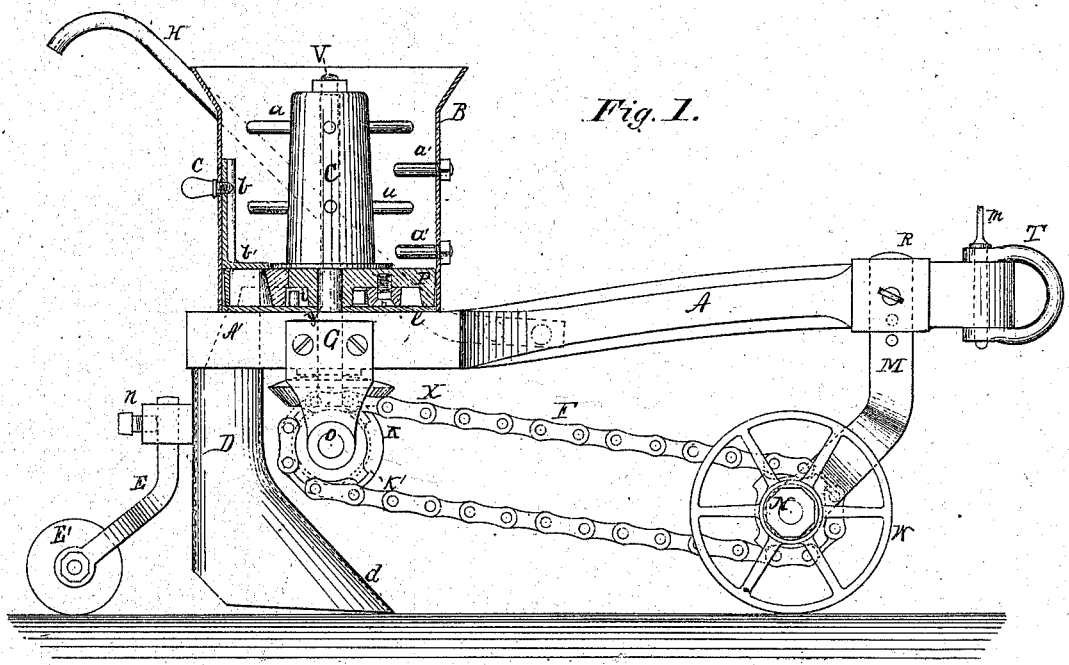
Figure 1 is a central longitudinal sectional view of my improved machine for plowing and planting.
Figure 2:
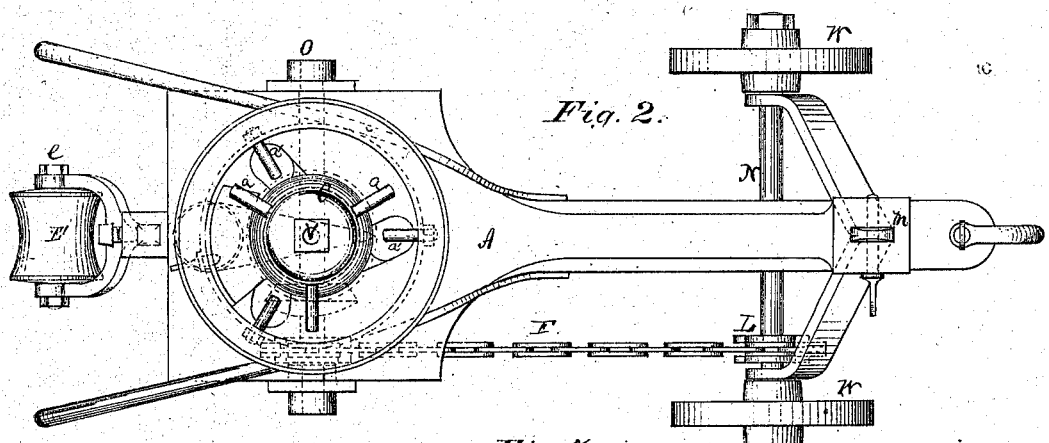
Figure 2 is a top or plan view.
Figures 3, 4:
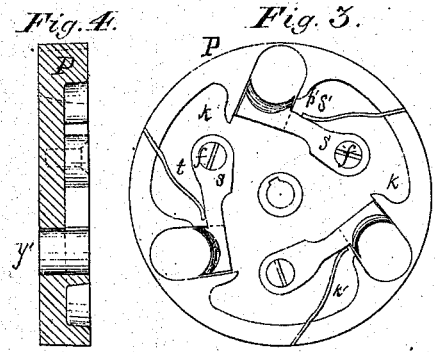

This invention relates to a machine for planting cotton-seed, corn, &c.; and

It consists in locating, in the bottom of a hopper, a revolving disk, provided with suitable openings for the passage of the seed, and a series of pivoted fingers, operated by a series of springs, and a stud, whereby the seed may be compressed before they enter the planting-shoe; also, in the combination of certain parts; all of which will hereinafter be more fully set forth.

In the drawing—

A may represent the platform of the machine.

B, the hopper.

C, a revolving vertical standard secured to a shaft, V, which carries the disk P and bevel-wheel X.

D is a metallic shoe, bearing an adjustable covering-roller, E.

K is a bevel-wheel, and

K', a chain-wheel, mounted upon a shaft, O, having its bearings in hangers G.

M is an adjustable standard, bearing the axle N and a chain-wheel, L, while

F is the operating endless chain, and

U, the handles of the machine.

The platform A, which serves also as a draft-beam of the machine, is made much wider at its rear end than the front portion, in order to furnish a firm support for a hopper, and other operating mechanism.

B is the hopper, into which the seed to be planted is placed. Said hopper is mounted upon the platform, and may be made of metal or wood, and of a circular formation.

Upon the inner circumference of this hopper is secured, in a suitable manner, a series of radiating arms or spikes, *a' a'*, so as to act in conjunction with a series of arms or spikes, extending outwardly from a vertical revolving shaft, hereinafter to be mentioned.

A circular plate, *e*, formed or provided with a projecting pin or stud, *i*, and openings, one at the center, for a vertical shaft to pass through, the other near the circumference, for seed to pass through, and is firmly secured upon the platform A.

This plate may be formed with the hopper in one piece, if it be desired, or it may be attached to the same in any suitable manner.

Within the hopper, at or near its bottom, is located a revolving disk, P, formed on one side with a concavity and projections, *p p'*, and with an opening, *y*, in the center for a shaft to pass through, and three or more openings, *y'*, near its circumference, for the seed to drop upon the ground through the medium of a metallic shoe, to be referred to hereinafter.

S S are fingers formed, on one side, with a shoulder and a concave surface, at or near their ends, on the other side, and are pivoted, or otherwise secured, within the concavity of the disk P, in such a manner that when the disk is revolved the shoulder of the finger comes in contact with the pin or stud *i*, upon the plate *e*, thus causing the finger to approach the opening *y* and compress the bulk of the seed that has passed into the opening, and when the stud *i* has passed beyond the shoulder of the finger the same is forced back by a spring, *t*, to its normal position; the seed being released, drop down through the hollow shoe upon the ground.

Thus, it will be seen that the position and relation of the pivoted fingers S, and its spring *t*, to the projections *p p'*, by the seed is prevented from lodging within the concavity, and interfere with the free movement of the fingers and springs, and that by compressing the bulk entering the opening on the disk from the hopper the seed is sure to fall and pass through the opening down into the shoe upon the ground.

A vertical revolving shaft, N, passes down through a vertical shaft, C, the revolving disk P, plate *e*, and the platform A, and carries upon its lower end a bevel-wheel, X, which gears or meshes into a bevel-wheel upon a horizontal shaft, hereinafter mentioned.

This vertical shaft V is secured upon the standard C in such a manner as to revolve with the said shaft V, and carry the disk P, and is made either of metal or wood, and formed or provided with a series of radiating arms or spikes, *a' a'*, to act as an agitator.

The standard C is retained upon the shaft V by means of a nut or pin placed upon the top of the shaft V.

*b* is a metallic plate bent in the form of a right angle, and is secured at one end, by bolts or screws, upon the inside surface of the hopper, while the other end rests upon the revolving disk, in order to lessen the strain upon the shaft V, and prevent the disk from rising in the hopper.

When the machine is in operation, the shaft revolves, and the seed are constantly stirred and prevented from becoming "clogged" or "choked" up in the hopper.

D is a metallic hollow shoe, secured upon the bottom of the platform immediately beneath the hopper, and communicates with the same through the openings in the platform, metal plate e, and revolving disk P.

The hollow shoe D enters the ground for the purpose of forming the ridge for receiving and planting the seed, its depth being regulated by means of a covering-roller, adapted to be raised or lowered, and is attached to the rear part of the said shoe.

E' is the covering-roller, made, preferably, of a concave form upon its periphery, and is journaled between diverging arms of the standard E, said standard passing through an opening in a block or bar attached to or formed with the hollow shoe D, and is rendered adjustable by means of a suitable set-screw.

By this arrangement of the covering-roller the point d of the shoe D can be so regulated as to enter the ground and plant the seed at any desired depth, while the seed dropped into the ridge made by the shoe in the ground is covered by the roller.

It is evident that a harrow may be attached to the rear of the frame, for the purpose of covering the seed.

A shaft, O, is placed horizontally to the platform A, and has its bearings within the hangers G G, secured upon and depending from the sides of the platform A.

This shaft O carries both a bevel-wheel, K, and a chain-wheel, K', the former meshing into the bevel-wheel X on the shaft V, the latter serving as the means for operating the shafts, and imparting rotary motion to the vertical shaft V.

F is an endless chain passing around chain-wheels on the shaft O and axle N, which carries the wheels W W.

The axle N has its bearings within the diverging arms j j of the standard M, which standard is formed with a series of openings, and is inserted and secured adjustably within a slot in the platform or beam-portion A by means of a pin passing transversely through the said platform.

Thus, by making the front standard adjustable, the depth that the shoe is desired to enter the ground and plant the seed can be regulated from the front as well as from the rear portion of the plow or planter.

The wheels W W are rigidly secured upon the axle N, so that as they rotate the chain will revolve with the said axle.

It is evident that two chain-wheels may be used, instead of one, and that the adjustable covering-roller can be attached to the platform or the shoe.

T is a clevis, secured upon the end of the platform or beam-portion A, in any suitable manner.

H H are handles, secured to the platform and extend out beyond the rear of the machine, in the usual manner.

Having thus described my invention,

What I claim as new, and desire to secure by Letters Patent, is—

1. The disk P, formed with a concavity on one side and a series of openings, $y'$, and carrying the pivoted fingers S and springs $t$, and operated by the pin or stud $i$, substantially as described, for the purpose set forth.

2. The bevel-wheel X, mounted on the shaft V, carrying the standard C, provided with arms or spikes $a'\ a'$, in combination with the disk P and stud $i$, substantially as described.

3. The axle N, journaled within bearings attached to the frame A, with the wheel L, chain F, wheels K and X, and shaft O, in combination with the standard C, disk P, stud $i$, and hopper B, the whole arranged and operating together, substantially as described.

To the above I have signed my name this 26th day of July, 1870.

PETER KLING.

Witnesses:
JOHN SEEDERS,
JAKOB SETZER.